United States Patent
Osada et al.

(10) Patent No.: US 7,659,686 B2
(45) Date of Patent: Feb. 9, 2010

(54) MOTOR-GENERATOR CONTROL SYSTEM

(75) Inventors: Masahiko Osada, Okazaki (JP);
Makoto Taniguchi, Oobu (JP); Hiroaki Ishikawa, Nagoya (JP); Kanji Takeuchi, Gamagoori (JP); Masakazu Tago, Aisai (JP)

(73) Assignee: Denso Corporation, Kariya (JP)

( * ) Notice: Subject to any disclaimer, the term of this patent is extended or adjusted under 35 U.S.C. 154(b) by 260 days.

(21) Appl. No.: 11/727,408

(22) Filed: Mar. 26, 2007

(65) Prior Publication Data
US 2007/0241699 A1    Oct. 18, 2007

(30) Foreign Application Priority Data
Mar. 24, 2006  (JP) .............................. 2006-083223

(51) Int. Cl.
*H02P 1/26* (2006.01)
(52) U.S. Cl. ..................... 318/771; 318/148; 318/154
(58) Field of Classification Search ................ 318/771, 318/148, 154, 140; 290/40; 180/65.2
See application file for complete search history.

(56) References Cited

U.S. PATENT DOCUMENTS

2003/0029653 A1 * 2/2003 Fujikawa .................... 180/65.2
2006/0006655 A1   1/2006 Kanazawa et al.

FOREIGN PATENT DOCUMENTS

| JP | 2000-041392 | 2/2000 |
|----|-------------|--------|
| JP | 2003-174790 | 6/2003 |
| JP | 2006-33897  | 2/2006 |

* cited by examiner

*Primary Examiner*—Karen Masih
(74) *Attorney, Agent, or Firm*—Nixon & Vanderhye P.C.

(57) ABSTRACT

In a motor-generator control system for controlling a motor-generator, first and second sets of multiphase windings of a motor-generator are arranged to be spatially shifted in phase from each other. An allocating unit is configured to, upon input of workload request for the motor-generator, determine a first torque to be allocated to the first set of multiphase windings and a second torque to be allocated to the second set of multiphase windings. A resultant torque of the first torque and second torque meets the input workload request for the motor-generator. An energizing unit is configured to energize the first set of multiphase windings to create the first torque and energize the second set of multiphase windings to create the second torque.

16 Claims, 12 Drawing Sheets

MOTOR-GENERATOR CONTROL SYSTEM

CROSS REFERENCE TO RELATED APPLICATIONS

This application is based on Japanese Patent Application 2006-083223 filed on Mar. 24, 2006. This application claims the benefit of priority from the Japanese Patent Application, so that the descriptions of which are all incorporated herein by reference.

FIELD OF THE INVENTION

The present invention relates to a motor-generator control system operative to control a motor-generator installed in a vehicle. More particularly, the present invention relates to a motor-generator control system capable of controlling torque output from a motor-generator depending on a request torque and/or a request number N of revolutions [rpm (revolutions per minutes)].

BACKGROUND OF THE INVENTION

Japanese Unexamined patent publications 2000-41392, 2003-174790, and 2006-33897 disclose motor systems with motors each of which is equipped with first and second sets of three-phase windings. Note that these Japanese Unexamined patent publications 2000-41392, 2003-174790, and 2006-33897 will be respectively referred to as first, second, and third publications, hereinafter.

Each of the motor systems also includes first and second inverters individually energize the respective first and second sets of three-phase windings.

The first and second publications, whose applicant is the same as this application, also disclose a configuration of first and second sets of three-phase windings in which the first set of three-phase windings is spatially shifted from the second set thereof by an electric angle of π/6 or π/3 radian in phase.

In the first and second publications, even if a fault occurs in one phase winding in, for example, the first set of three-phase windings, the second inverter can normally energize the second set of three-phase windings, thereby continuously operating the motor-generator even in the event of one-phase winding failure.

In such motor systems whose first and second sets of three-phase windings are configured to be individually driven by corresponding first and second inverters, how to specifically energize the first and second sets of three-phase windings may have not been sufficiently disclosed. For this reason, users have been awaited suggestions about how to specifically energize the first and second sets of three-phase windings.

SUMMARY OF THE INVENTION

In view of the background, an object of at least one aspect of the present invention is to specifically disclose how to energize first and second sets of multiphase windings of a motor-generator, thereby providing a variety of usages of the motor-generator with first and second sets of multiphase windings.

According to one aspect of the present invention, there is provided a motor-generator control system for controlling a motor-generator. The motor-generator has a first set of multiphase windings and a second set of multiphase windings. The first and second sets of multiphase windings are arranged to be spatially shifted in phase from each other. The motor-generator control system includes an allocating unit configured to, upon input of workload request for the motor-generator, determine a first torque to be allocated to the first set of multiphase windings and a second torque to be allocated to the second set of multiphase windings. A resultant torque of the first torque and second torque meets the input workload request for the motor-generator. The motor-generator control system includes an energizing unit configured to energize the first set of multiphase windings to create the first torque and energize the second set of multiphase windings to create the second torque.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
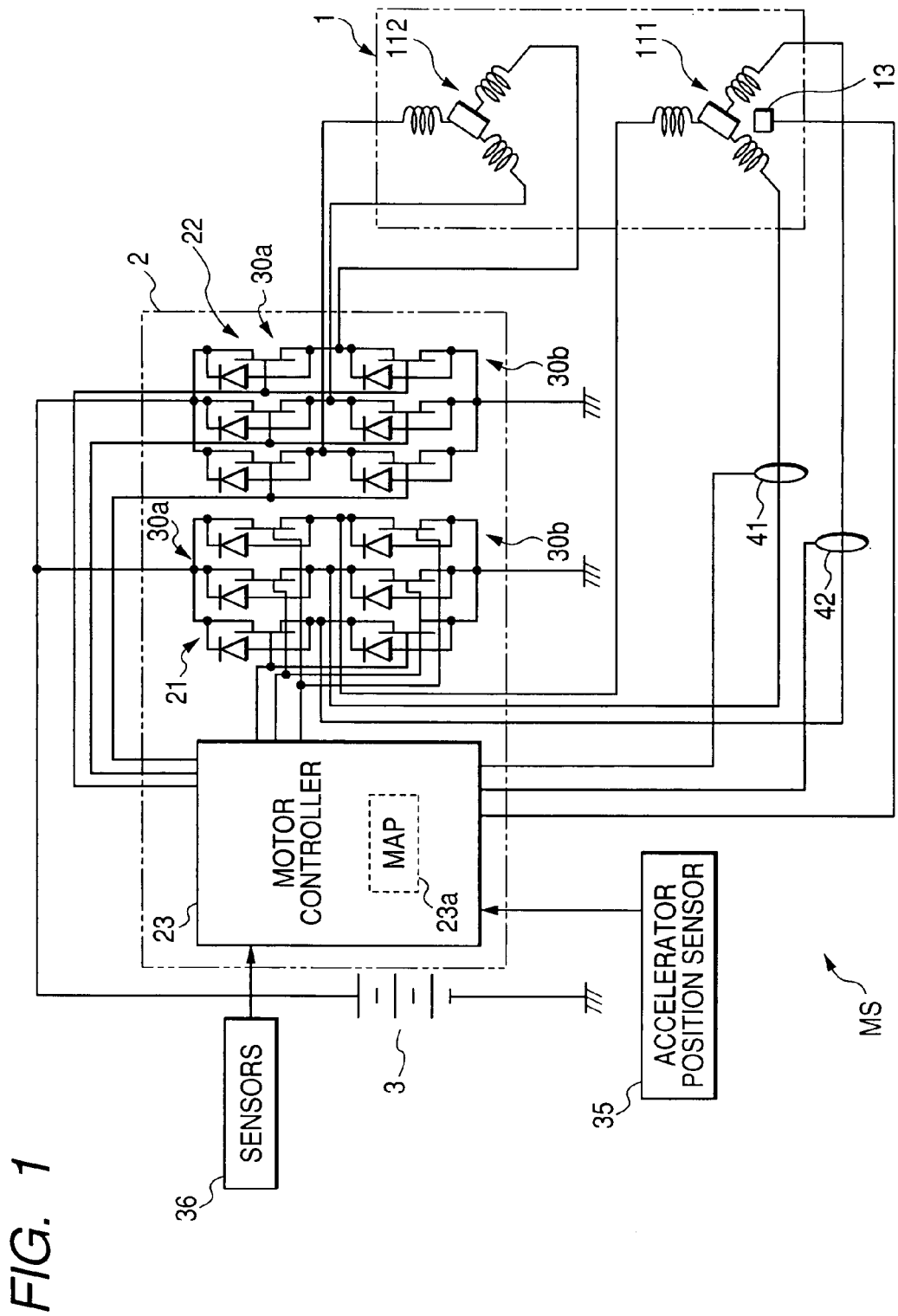
FIG. 1 is a circuit diagram of a motor-generator control system according to a first embodiment of the present invention.

Referring to the drawings, in which like reference characters refer to like parts in several views, particularly to FIG. 1, there is illustrated a motor-generator control system MS according to a first embodiment of the present invention.

As illustrated in FIG. 1, the motor-generator control system MS is installed beforehand in a vehicle, such as a hybrid vehicle.

The motor-generator control system MS includes a synchronous motor-generator 1 as an example of various types of motor-generators. The synchronous motor-generator 1 works to rotate a crankshaft of an engine installed in the vehicle, and to charge a battery described hereinafter when the vehicle is decelerating or braking.

The motor-generator 1 is designed as, for example, an inner-rotor (outer-stator) synchronous motor.

Figure 3:
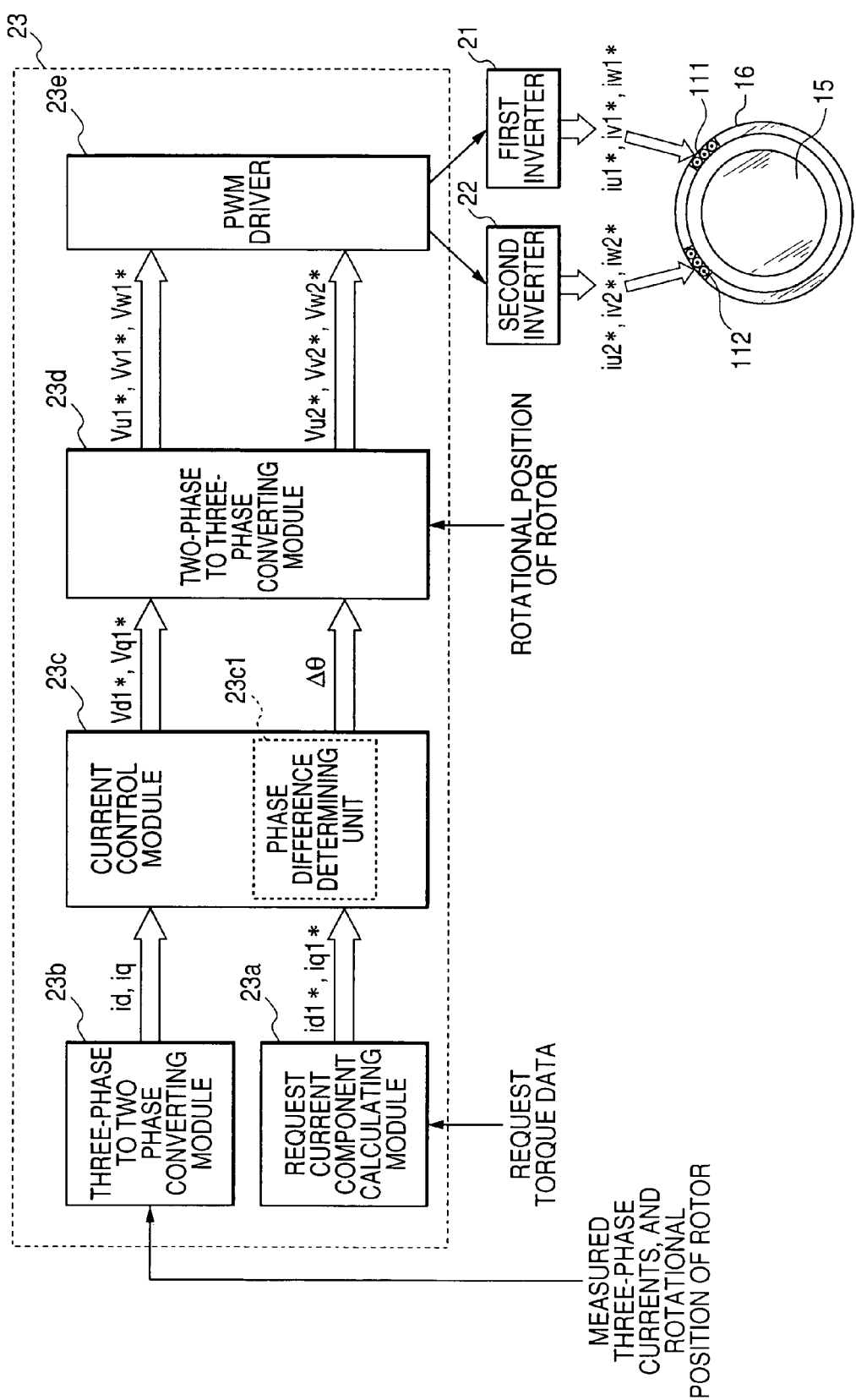
FIG. 3 is a block diagram schematically illustrating functional modules of a motor controller illustrated in FIG. 1.

Specifically, the inner-rotor motor-generator 1 is provided with a rotor 15 and a stator 16 (see FIG. 3). The rotor 15 includes a rotor core.

In the first embodiment, as the rotor core, a salient pole core without containing field coils and filed magnets is used for example. Note that various types of cores, such as a permanent magnet core, can be used as the rotor. The rotor core has an annular shape in its lateral cross section. The rotor core is fixedly fitted around the outer periphery of the crankshaft.

The rotor core of the rotor 15 is provided with salient pole pairs (N and S poles) arranged, for example, in a radial direction with one field pole pitch of an electric angle of $\pi$ radian. The rotor 15 has a direct axis (D-axis) in line with the rotor N pole center line, and has a quadrature axis (Q-axis) located by a $\pi/2$ radian electric angle leading with respect to the D-axis between adjacent poles.

The stator 16 includes a stator core with an annular shape in its lateral cross section. The stator core is disposed around the outer periphery of the rotor core such that the inner periphery of the stator core is opposite to the outer periphery of the rotor core with a predetermined air gap.

The stator core also has a plurality of (e.g. 12) slots. The slots are formed through the stator core and are circumferentially arranged at given intervals. In the first embodiment, the 12 slots of the stator core occupies an electric angle of $2\pi$ radian of the stator 16, so that circumferential interval of adjacent slots defines a slot pitch corresponding to an electric angle $\alpha$ of $\pi/6$ radian.

The stator 16 also includes first and second sets 111 and 112 of three-phase windings wound in the slots of the stator core such that the first and second sets of three-phase windings are shifted by an electric angle of $\pi/6$ radian (30 degrees) in phase from each other. For example, in the first embodiment, the first set of three-phase windings is advanced in phase of $\pi/6$ radian from the second set of three-phase windings.

The three-phase windings of the first set 111 are wound in the slots such that the U-, V-, and W-phase windings of the first set 111 are shifted by an electric angle of $2\pi/3$ radian in phase from each other. Similarly, the three-phase windings of the second set 112 are wound in the slots such that the U-, V-, and W-phase windings of the second set 112 are shifted by an electric angle of $2\pi/3$ radian in phase from each other.

One ends of the U-, V-, and W-phase windings of the first set 111 are connected to each other in, for example, star configuration to constitute an individual neutral point, and similarly, one ends of the U-, V-, and W-phase windings of the second set 112 are connected to each other in, for example, star configuration to constitute an individual neutral point.

The motor-generator 1 includes a resolver 13 arranged close to the rotor 15 and operative to measure an actual rotational position (rotational angle) $\delta$ of the d-axis of the rotor 15 with respect to a stator coordinate system fixed in space which characterizes the first set 111 of three-phase windings.

The motor-generator control system MS includes a motor control unit 2 and a battery 3. The motor control unit 2 is operative to control the operation of the motor-generator 1 and to feed and/or receive three-phase alternating currents to/from each of the first and second sets of the three-phase windings 111 and 112.

Specifically, the motor control unit 2 includes first and second three-phase inverters 21 and 22, and a motor controller 23. The first and second three-phase inverters 21 and 22 will be referred to simply as "first and second inverters 21 and 22 hereinafter.

Each of the first and second inverters 21 and 22 is composed of a number of, e.g. six, power switching elements 30 each including, for example, an IGBT (Insulated Gate Bipolar Transistor) and a flywheel diode. The power switching elements 30 are connected in half-bridge configuration.

Specifically, in the first and second inverters 21 and 22, the six power switching elements 30 are divided into high-side switching elements 30a and low-side switching elements 30b each with first and second terminals.

The first terminals of the high-side switching terminals 30a are connected to each other, and commonly connected to a positive terminal of the battery 3. Each of the second terminals of the high-side switching elements 30a is connected to the first terminal of a corresponding one of the low-side switching elements 30b, which provides three half-bridges each consisting a high-side switching element and a corresponding low-side switching element.

The second terminals of the low-side switching elements 30b are connected to each other and to be commonly grounded. Each of the high- and low-side elements 30a and 30b has a control terminal connected to the motor controller 23, which allows the motor controller 23 to individually switch on and off them.

The connecting points between the high- and low-side switching elements 30a and 30b of the respective half-bridges of the first inverter 21 are connected to output leads extending from the other ends of the U-, V-, and W-phase windings of the first set 111. Similarly, the connecting points between the high- and low-side switching elements 30a and 30b of the respective half-bridges of the second inverter 22 are connected to output leads extending from the other ends of the U-, V-, and W-phase windings of the second set 112.

The motor controller 23 is connected to an accelerator position sensor 35 serving as a request torque input device. The accelerator position sensor 35 is operative to sense an actual position of an accelerator pedal of the vehicle operable by the driver and to send, as data representing a request torque of the driver, the sensed actual position of the accelerator pedal to the motor controller 23. The data representing a variable request torque will be referred to as "request torque data" hereinafter.

Upon input of the data sent from the accelerator position sensor 35, the motor controller 23 is operative to determine a command voltage value for each of the U-, V-, and W-phase windings 111 of the first set and for each of the U-, V-, and W-phase windings 112 of the second set. The motor controller 23 is also operative to control the first and second inverters 21 and 22 based on the corresponding determined command voltage values.

As described above, the positive terminal of the battery 3 is corrected to the first terminals of the high-side switching terminals 30a of each of the first and second inverters 21 and 22. A negative terminal of the battery 3 is grounded. The battery 3 is operative to transfer and/or receive electric power to/from the first set 111 of three-phase windings via the first inverter 21, and similarly, transfer and/or receive electric power to/from the second set 112 of three-phase windings via the second inverter 22.

The motor-generator control system MS further includes first and second current sensors 41 and 42. The first current sensor 41 is arranged to allow measurement of an instantaneous U-phase alternating current flowing through the U-phase winding of the first set 111. Similarly, the second current sensor 42 is arranged to allow measurement of an instantaneous W-phase alternating current flowing through the W-phase winding of the first set 111. The first and second current sensors 41 and 42 are connected to the motor controller 23.

Specifically, the first and second current sensors 41 and 42 are operative to send, to the motor controller 23, the instantaneous value of each of the U- and W-phase currents as some of motor state variables. In addition, the resolver 13 is connected to the motor controller 23 and operative to send, to the motor controller 23, the measured actual rotation angle of the rotor 15 as one of the motor state variables.

When receiving the request torque data and the motor state variables, the motor controller 23 is operative to intermittently switch the switching elements 30a and 30b of each of the first and second inverters 21 and 22 on and off based on the received torque data and the motor state variables. This makes it possible to individually convert the DC voltage applied from the battery 3 to the first and second inverters 21 and 22 into U-, V-, and W-phase AC voltages for each of the first and second sets 111 and 112.

In addition, when the vehicle is decelerating or braking, each of the first and second inverters 21 and 22 is operative to full-wave rectify a three-phase alternating voltage generated by a corresponding one of the first set 111 and the second set 112 of three-phase windings. Then, each of the first and second inverters 21 and 22 is operative to charge the full-wave rectified voltage (DC voltage) into the battery 3.

The motor-generator control system MS also includes engine operating condition sensors 36 installed beforehand in the vehicle and arranged to measure various types of physical quantities associated with operating conditions of the engine. For example, the engine condition sensors 36 includes a sensor operative to measure the engine speed equivalent to the number N of revolutions of the motor-generator 1. A sensor operative to measure the number N of revolutions of the motor-generator 1 can be contained in the sensors 36.

Measurement signals indicative of measured physical quantities output from the engine operating condition sensors 36 are periodically input to the motor controller 23.

Note that, as described above, operations of each of the first and second inverters 21 and 22 and those of the motor controller 23 are substantially identical to those of normal brushless DC (Direct Current) motors. Thus, operations of each of the first and second inverters 21 and 22 and those of the motor controller 23 associated with specific features of the first embodiment will be mainly described.

The instantaneous U-phase alternating current and the W-phase current of the first set 111 are measured by the first and second current sensors 41 and 42, and the actual rotational position of the rotor 15 is measured by the resolver 31 with reference to the first set of three-phase windings. The measured U- and W-phase currents and the measured rotational position of the rotor 15 are sent to the motor controller 23, respectively.

Simultaneously, the request torque data is input from the accelerator position sensor 35 to the motor controller 23.

The torque developed by the motor-generator 1 has determined depending on the magnitude and phase of request stator current vector with respect to the orientation of the Q-axis. For this reason, the request stator current vector will be referred to as "request torque vector" hereinafter.

Specifically, in the first embodiment, the motor controller 23 works to control the torque by controlling a D-axis current component id* that generates a magnetic flux in the D-axis, and a Q-axis current component iq* that generates a magnetic flux in the Q-axis and leads in phase by an electric angle of $\pi/2$ radian with respect to the D-axis current component id*; these D-axis current component id* and Q-axis current component iq* constitute the request stator current vector.

Figure 2A:
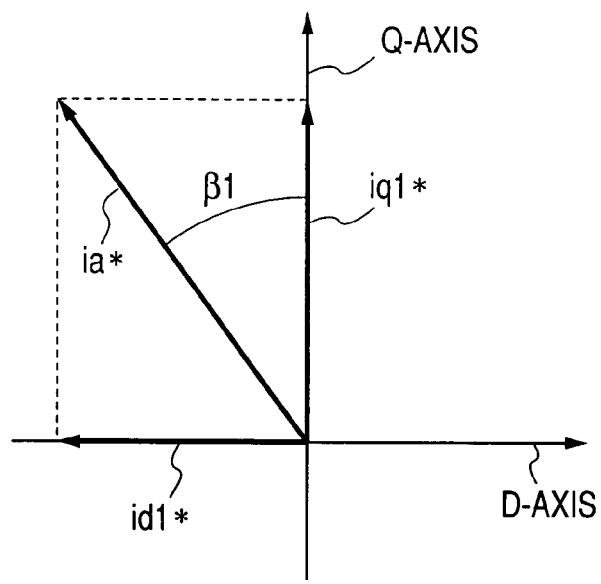
FIG. 2A is a vector diagram schematically illustrating a stator current vector in Cartesian coordinates by a D-axis component and Q-axis current component.

Assuming that no second set 112 of three-phase windings are wound in the stator core, as illustrated in FIG. 2A, request stator current vector ia* corresponding to the sum of the instantaneous U-, V-, and W-phase current vectors the first set 111 can be specified in:

polar coordinates by the amplitude of ia* and a phase difference (electric angle) $\beta 1$ between the commanded stator current vector ia* and the Q-axis, or in Cartesian coordinates by a D-axis component id1* and Q-axis current component iq1*. In other words, the D-axis component id1* is given by "ia*sin $\beta 1$", and the Q-axis component iq1* is given by "ia*cos $\beta 1$".

Specifically, the torque T developed by the motor-generator 1 based on the D-axis component id1* and Q-axis current component iq1* is given by the following equations [1] and [2]:

$$T=p(Ld-Lq)id1^*iq1^* \quad [1]$$

$$T=Kp(Ld-Lq)id1^*iq1^*\sin 2\beta 1 \quad [2]$$

where K represents a constant, p represents the number of pairs of poles, Ld represents a D-axis inductance, and Lq represents a Q-axis inductance.

Thus, when the measured values of the U- and W-phase alternating currents, the measured rotational position of the rotor 15, and the request torque data are input to the motor controller 23, the motor controller 23 receives them. Then, as illustrated in FIG. 3, a request current component calculating module 23a of the controller 23 calculates request D-axis component id1* and Q-axis component iq1* for the first set 111 based on request stator current vector corresponding to the request torque data.

On the other hand, a three-phase to two-phase converting module 23b of the controller 23 works to calculate the V-phase alternating current value based on the measured U- and W-phase alternating current values and the rotational position $\delta$ of the rotor 15, and to convert the three-phase current values into D-axis component id1 and Q-axis current component iq1 for the first set 111.

A current control module 23c of the controller 23 works to compare the request D-axis component id1 * and Q-axis component iq1* with the measured D-axis component id1 and Q-axis current component iq1, and to perform feedback control and/or a combination of feedback control and feedforward control based on the comparison result, thereby determining command voltage values Vd1* and Vq1* in the D-axis and Q-axis for the first set 111 that allow the request D-axis component id1* and Q-axis component iq1* to be matched with the measured D-axis component id1 and Q-axis current component iq1.

A two-phase to three-phase converting module 23d of the controller 23 works to:

convert the command voltage values Vd1* and Vq1* in the D-axis and Q-axis into command voltage values Vu1*, Vv1*, and Vw1* in the U-, V-, and W-phase windings of the first set 111; and feed, to a PWM driver 23e, the command voltage values Vu1*, Vv1*, and Vw1* of the U-, V-, and W-phase windings of the first set 111.

The PWM driver 23e of the controller 23 works to individually generate a PWM signal, which consists of a train of pulses of high and low voltage levels at predetermined time periods with a duty cycle in each period, for each of the high- and low-side switching elements 30a and 30b of the first inverter 21 based on the command voltage values Vu1*, Vv1*, and Vw1* of the U-, V-, and W-phase windings of the first set 111.

The PWM driver 23e applies the PWM signal to the control terminal of each of the high- and low-side switching elements 30a and 30b of the first inverter 21. This allows each of the switching elements 30a and 30b to be individually switched on and off based on the corresponding duty cycle, thereby individually converting the DC voltage applied from the battery 3 to the first inverter 21 into U-, V-, and W-phase AC voltages.

As a result, the U-, V-, and W-phase AC voltages are applied to the respective U-, V-, and W-phase windings of the first set 111, so that U-, V-, and W-phase alternating currents iu1*, iv1*, and iw1* are supplied to the respective U-, V-, and W-phase windings of the first set 111.

In addition, in the first embodiment, the current control module 23c of the controller 23 works to:

obtain actual operating conditions of the engine (vehicle) based on the measurement signals output from the sensors 36;

determine a phase difference Δθ in electric angle based on the request torque data and the operating conditions of the engine; and add the determined phase difference Δθ to the rotational position δ of the rotor 15 to thereby output the sum of the phase difference Δθ and the rotational position δ of the rotor 15 to the two-phase to three-phase converting module 23d.

The two-phase to three-phase converting module 23d of the controller 23 further works to:

convert the command voltage values Vd1* and Vq1* in the D-axis and Q-axis into command voltage values Vu2*, Vv2*, and Vw2* in the U-, V-, and W-phase windings of the second set 112 the sum of the phase difference Δθ and the rotational position δ of the rotor 15; and feed, to the PWM driver 23e, the command voltage values Vu2*, Vv2*, and Vw2* of the U-, V-, and W-phase windings of the second set 112.

The PWM driver 23e of the controller 23 works to individually generate a PWM signal for each of the high- and low-side switching elements 30a and 30b of the second inverter 22 based on the command voltage values Vu2*, Vv2*, and Vw2* of the U-, V-, and W-phase windings of the second set 112.

The PWM driver 23e applies the PWM signal to the control terminal of each of the high- and low-side switching elements 30a and 30b of the second inverter 22. This allows each of the switching elements 30a and 30b to be individually switched on and off based on the corresponding duty cycle, thereby individually converting the DC voltage applied from the battery 3 to the second inverter 22 into U-, V-, and W-phase AC voltages.

As a result, the U-, V-, and W-phase AC voltages are applied to the respective U-, V-, and W-phase windings of the second set 112, so that U-, V-, and W-phase alternating currents iu2*, iv2*, and iw2* are supplied to the respective U-, V-, and W-phase windings of the second set 112.

Note that, in the first embodiment, current sensors can be provided to measure instantaneous alternating current values of one and another one phase windings of the second set 112. This allows the motor controller 23 to obtain the U-, V-, and W-phase alternating currents iu2*, iv2*, and iw2* in the same manner as the U-, V-, and W-phase alternating currents iu1*, iu1*, and iw1*. The structure of the motor controller 23 illustrated in FIG. 3 can eliminate the current sensors for measuring instantaneous alternating current values of one and another one phase windings of the second set 112.

Note that the modules 23a to 23e of the motor controller 23 can be designed as hardwired logic devices or programmed logic devices, such as microcomputers, or can be designed as hardwired and programmed logic devices in combination.

Specifically, in the first embodiment of the present invention, the motor controller 23 determines command voltage values Vu1*, Vv1*, and Vw1* of the U-, V-, and W-phase windings of the first set 111 based on the measured rotational angle δ of the rotor 15, the measured three-phase currents, the input torque request data, and the operating conditions of the engine including the RPM of the motor-generator 1.

Then, the motor controller 23 converts the command voltage values Vu1*, Vv1*, and Vw1* into PWM signals individually for the respective high- and low-side switching elements 30a and 30b of the first inverter 21, thereby individually outputting them to the switching elements 30a and 30b of the first inverter 21.

In addition, in the first embodiment of the present invention, the motor controller 23 shifts, by the phase difference Δθ, the command voltage values Vu1*, Vu1*, and Vw1* in phase to determine command voltage values Vu2*, Vv2*, and Vw2* of the U-, V-, and W-phase windings of the second set 112. Then, the motor controller 23 converts the command voltage values Vu2*, Vv2*, and Vw2* into PWM signals individually for the respective high- and low-side switching elements 30a and 30b of the first inverter 21, thereby individually outputting them to the switching elements 30a and 30b of the second inverter 22.

Figure 2B:
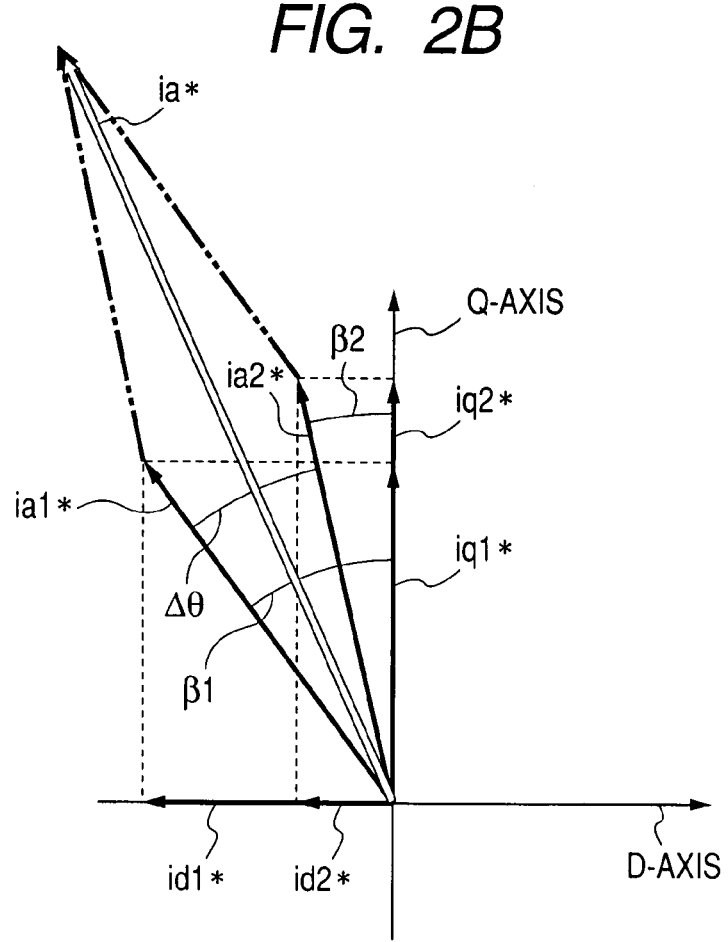
FIG. 2B is a vector diagram schematically illustrating a phase difference between a stator current vector of a first set of three-phase windings illustrated in FIG. 1, and a stator current vector of a second set of three-phase windings illustrated in FIG. 1.

Specifically, FIG. 2B illustrates D-axis component id1* and Q-axis component iq1* corresponding to the U-, V-, and W-phase alternating currents iu1*, iv1*, and iw1* to be supplied to the respective U-, V-, and W-phase windings of the first set 111. In addition, FIG. 2B illustrates a D-axis component id2* and Q-axis component iq2* corresponding to the U-, V-, and W-phase alternating currents iu2*, iv2*, and iw2* to be supplied to the respective U-, V-, and W-phase windings of the second set 112.

As illustrated in FIGS. 2B and 3, in the first embodiment, a phase difference determining unit (request torque allocating unit) 23c1 determines the phase difference Δθ between a phase β1 of a request stator current vector ia1* corresponding to the sum of the instantaneous U-, V-, and W-phase current vectors the first set 111 and a phase β2 of a request stator current vector ia2* corresponding to the sum of the instantaneous U-, V-, and W-phase current vectors the second set 112.

The determination allows a first torque of the stator current vector ia1* based on the D-axis component id1* and Q-axis component iq1* and a second torque of the stator current vector ia2* based on the D-axis component id2* and Q-axis component iq2* to be individually controlled.

In other words, as illustrated in FIGS. 2B and 3, the phase difference determining unit 23c1 allows a request torque corresponding to a request stator current vector ia* to be desirably allocated to both the first set 111 of three-phase windings and the second set 112 of three-phase windings.

That is, as illustrated in FIG. 2B, it is possible to individually generate a first torque vector based on a first stator current vector ia1* consisting of the D-axis component id1* and Q-axis component iq1* (the phase β1) and a second torque vector based on a second stator current vector ia2* consisting of the D-axis component id2* and Q-axis component iq2* (the phase β2), thereby generating a resultant torque vector based on the first torque vector and the second torque vector; this resultant torque vector is equivalent to the request torque vector.

Therefore, in the first embodiment, control of the phase difference Δθ between the first stator current vector ia1* based on the D-axis component id1* and Q-axis component iq1* and the second stator current vector ia2* based on the D-axis component id2* and Q-axis component iq2* permits adjustment of the magnitude of the resultant torque equivalent to the request torque.

For example, when the request torque is high with low engine speed at start-up or during climbing, the phase difference determining unit 23c1 of the motor-controller 23 works to:

set the phase β1 of the first stator current vector ia1* to a predetermined electric angle;

set the phase β2 of the first stator current vector ia2* to a predetermined electric angle; and adjust the phase difference Δθ between the phases β1 and β2 so that the first stator current vector ia1* is advanced in phase by π/6 from the first stator current vector ia2*; this π/6 is matched with the special phase advance π/6 of the first set 111 of three-phase windings from the second set 112 of three-phase windings.

This allows the resultant torque to reach its maximum value insofar as current values flowing through the first and second sets 111 and 112 of three-phase windings are limited within a predetermined allowable value. Note that a special phase shift between the first and second sets 111 and 112 of three-phase windings can be set to another electric angle.

Figure 4:
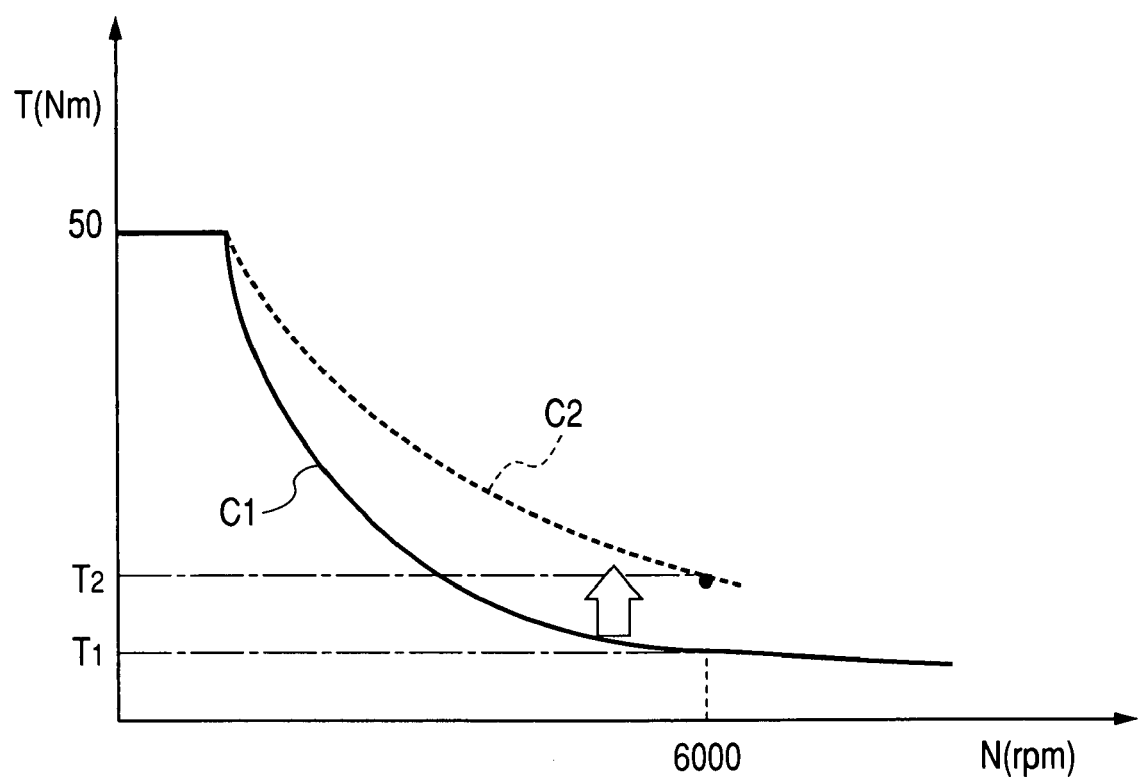
FIG. 4 is a graph schematically illustrating a speed-torque characteristic curve of a motor-generator illustrated in FIG. 1.

For example, FIG. 4 illustrates a speed-torque characteristic curve C1 of the motor-generator 1 according to the first embodiment. In FIG. 4, for example, the maximum value of the resultant torque is 50 (Nm) when the output voltage of the battery 3 is set to be 27 V(rms).

As illustrated in FIG. 4, the speed-torque characteristic curve C1 decreases with increase of the engine speed (the number N of revolutions of the motor-generator 1. This is because a counter-electromagnetic force induced in the three-phase windings is proportional to the number N of revolutions of the motor-generator 1

For this reason, decrease of the magnitude of the counter-electromagnetic force allows the torque at a predetermined number of revolutions of the motor-generator 1 to increase.

On the other hand, the counter-electromagnetic force is proportional to a magnitude of a first magnetic flux generated based on the U-, V-, and W-phase alternating currents of the first set 111 of the three-phase windings. In addition, the torque developed by the motor-generator 1 is proportional to the magnitude of the first magnetic flux, and the torque is also proportional to the square of the magnitude of the stator current.

Thus, even if the magnitude of the first magnetic flux is reduced, it is possible to maintain the torque because the torque is proportional to the square of the magnitude of the stator current.

Therefore, in the first embodiment, control of the phase difference Δθ causes the second magnetic flux generated based on the U-, V-, and W-phase alternating currents of the second set 112 of the three-phase windings to be inverted in phase from the first magnetic flux generated based on the U-, V-, and W-phase alternating currents of the first set 111 of the three-phase windings. This allows the first magnetic flux and the second magnetic flux to cancel each other, making it possible to increase the torque (resultant torque) developed by the motor-generator 1 at a predetermined engine speed N.

For example, as illustrated in FIG. 4, at the engine speed N of 6000 (rpm), the magnetic flux canceling set forth above allows a speed-torque characteristic curve to increase from the speed-torque characteristic curve C1 to a speed-torque characteristic curve C2. This makes it possible to substantially maximize the torque developed by the motor-generator 1 at the engine speed N of 6000 (rpm) from the previous value T1 to a new value T2 that is substantially double the previous value T1, and therefore to maximize the output of the motor-generator 1 at the engine speed N of 6000 (rpm).

As described above, in the first embodiment, the motor controller 23 is operative to control the phase difference Δθ based on an input request torque and/or an input RPM for the motor-generator 1 to allocate part of the request torque to the first set 111 of three-phase windings, and the remaining part thereof to the second set 112 of three phase winding at a desired rate in accordance with many purposes.

For example, the motor controller 23 can control the phase difference Δθ based on the request torque data to cause the first set 111 of three-phase windings to create a positive torque (motor torque) and the second set 112 of three-phase windings to create a negative torque (regenerative torque).

Moreover, the motor controller 23 can control the phase difference Δθ based on the request torque data to supply three-phase currents to the first set 111 of three-phase windings at the highest efficiency of the motor-generator 1, and to supply three-phase currents to the second set 112 of three-phase windings, thereby generating the maximum torque.

Figure 5:
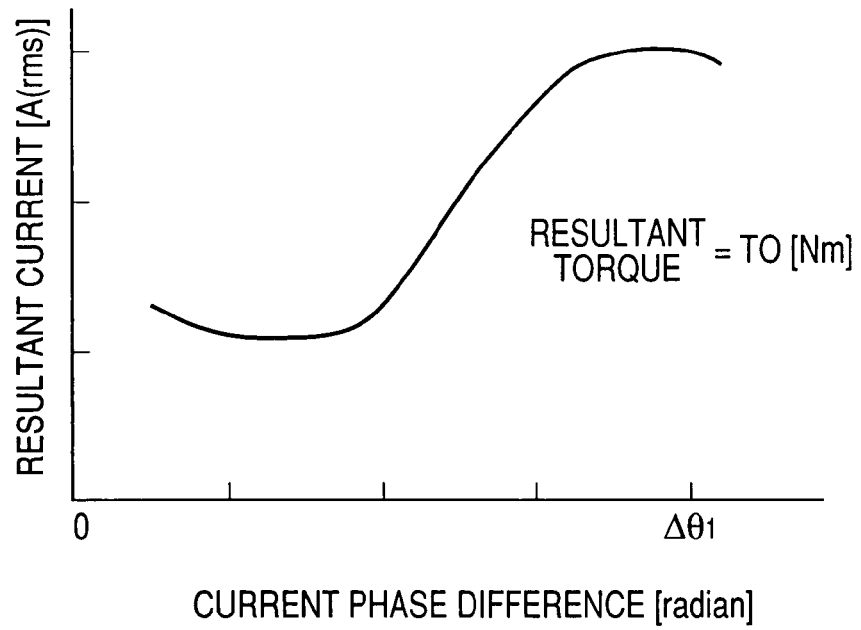
FIG. 5 is a graph schematically illustrating a resultant-current change curve when a phase difference is changed with a resultant torque obtained by the motor-generator kept to T0.

FIG. 5 schematically illustrates a resultant-current change curve when the phase difference Δθ is changed with the resultant torque obtained by the motor-generator 1 kept to T0. Specifically, as illustrated in FIG. 5, when the phase advance of the first stator vector ia*1 from the first stator vector ia2* is substantially set to an electric angle of Δθ1. This electric angle of Δθ1 can be determined based on, for example, the special phase advance π/6 of the first set 111 of three-phase windings from the second set 112 of three-phase windings and the magnitude of the counter-electromagnetic force induced in the three-phase windings. The determination of the electric angle of Δθ1 makes it possible to substantially maximize the resultant stator current ia* with the resultant torque obtained by the motor-generator 1 kept to T0.

Figure 6:
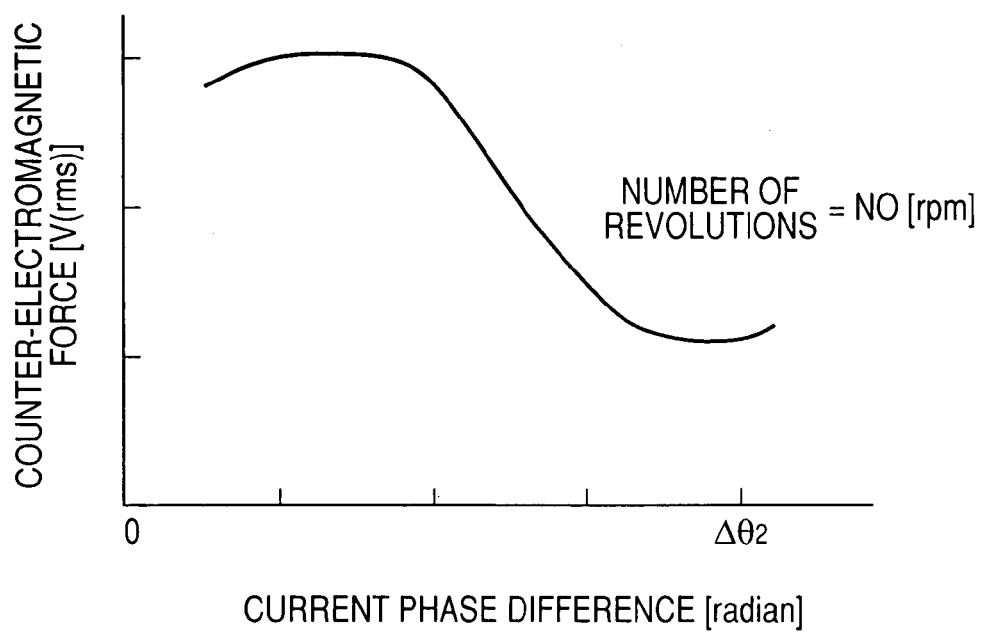
FIG. 6 is a graph schematically illustrating a counter-electromagnetic force change curve when a phase difference is changed with the number of revolutions of the motor-generator kept to N0.

FIG. 6 schematically illustrates a counter-electromagnetic force change curve when the phase difference Δθ is changed with the number of revolutions of the motor-generator 1 kept to N0. Specifically, as illustrated in FIG. 6, when the phase delay of the second stator vector ia*2 from the first stator vector ia1* is substantially set to an electric angle of Δθ2. This electric angle of Δθ2 can be determined based on, for example, the special phase advance π/6 of the first set 111 of three-phase windings from the second set 112 of three-phase windings and the magnitude of the counter-electromagnetic force induced in the three-phase windings. The determination of the electric angle of $\Delta\theta2$ makes it possible to substantially minimize the counter-electromagnetic force with the number of revolutions of the motor-generator 1 kept to N0.

Figure 7:
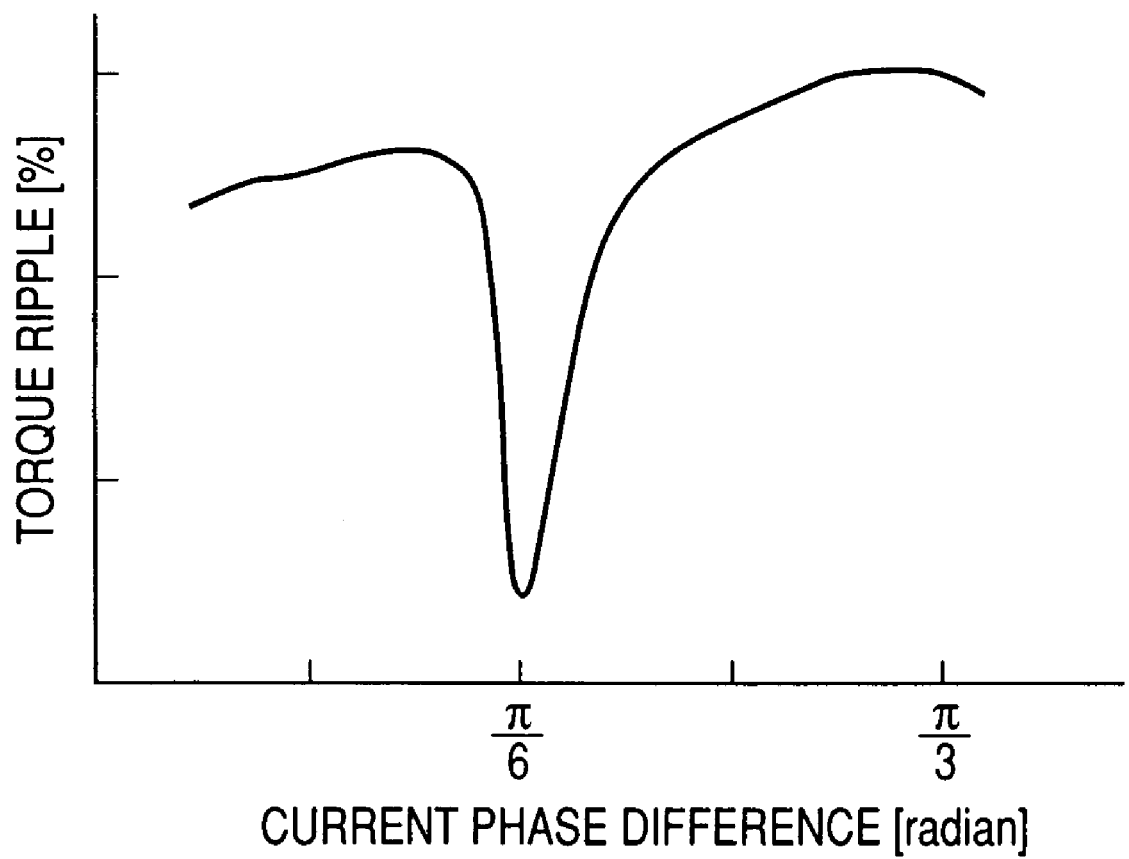
FIG. 7 is a graph schematically illustrating a torque ripple change curve when a phase difference is changed.

FIG. 7 schematically illustrates a torque ripple change curve when the phase difference $\Delta\theta$ is changed. Specifically, as illustrated in FIG. 7 when a phase advance $\Delta\theta$ of the first stator vector ia*1 from the second stator vector ia2* is substantially in agreement with the special phase advance $\pi/6$ of the first set 111 of three-phase windings from the second set 112 of three-phase windings, it is possible to substantially minimize the torque ripple.

Items of data representing the curves depending on the change in the current phase difference $\Delta\theta$ and illustrated in FIGS. 5 to 7 can have been stored in the motor-controller 1. This allows the motor-generator control system MS to use the items of data, thereby adjusting the phase difference $\Delta\theta$ based on the items of data representing the curves depending on the change in the current phase difference $\Delta\theta$.

Second Embodiment

A motor-generator control system MS 1 according to a second embodiment of the present invention will be described hereinafter.

Figure 8:
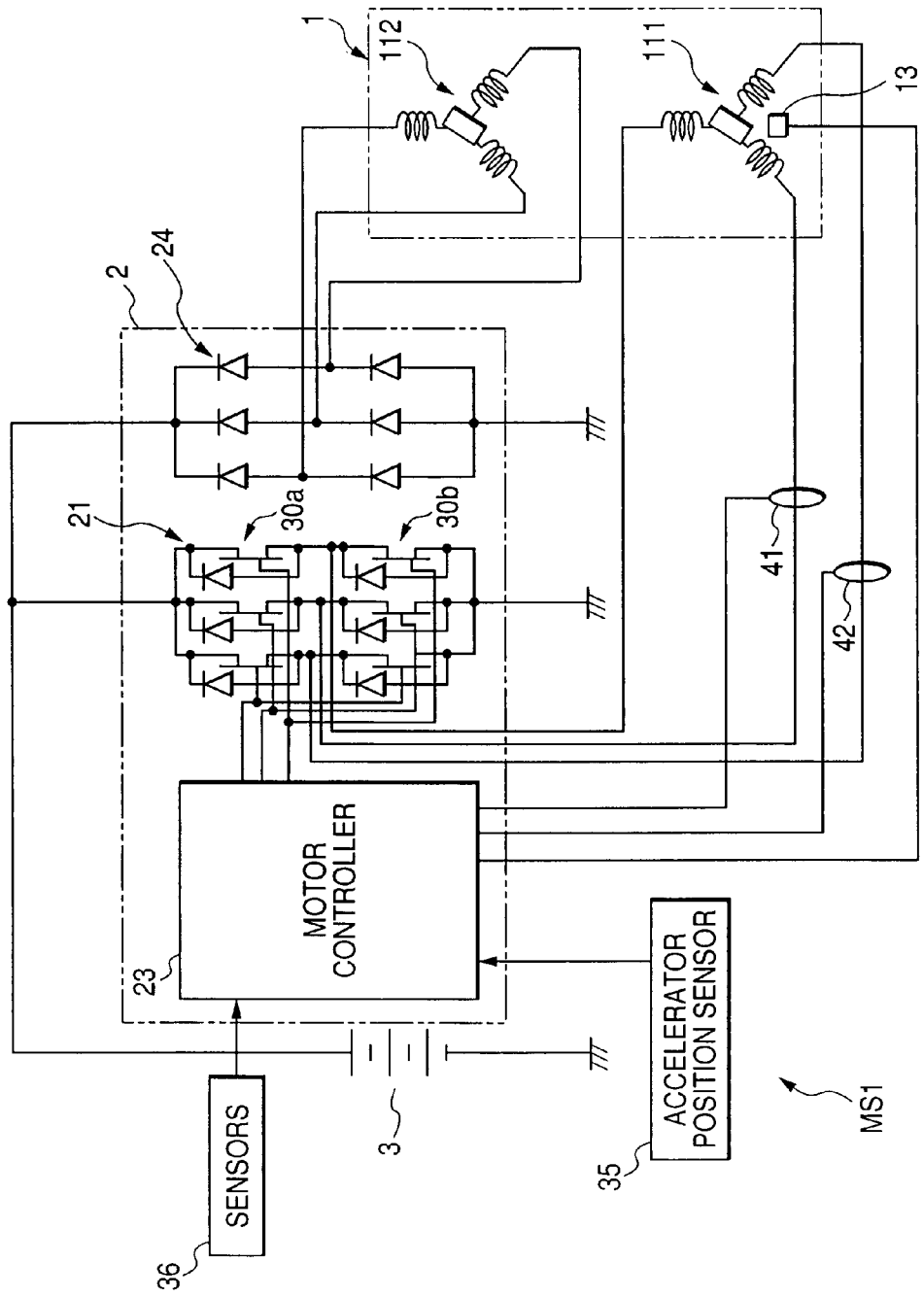
FIG. 8 is a circuit diagram of a motor-generator control system according to a second embodiment of the present invention.

FIG. 8 schematically illustrates an example of the structure of the motor-generator control system MS1 according to the second embodiment.

Like reference characters are assigned to like parts in the motor-generator control systems according to the first and second embodiments, and therefore, descriptions of the like parts are omitted.

A main different point of the structure of the motor-generator control system MS1 from the motor-generator control system MS is that the second inverter 22 is replaced to a three-phase full-wave rectifier 24.

The three-phase full-wave rectifier 24 is configured to only perform full-wave rectifying operations without carrying out inverting operations described in the first embodiment.

Specifically, the three-phase full-wave rectifier 24 is operative to full-wave rectify a three-phase alternating voltage generated by the second set 112 of three-phase windings. Then, the three-phase full-wave rectifier 24 is operative to charge the full-wave rectified voltage (DC voltage) into the battery 3.

Third Embodiment

A motor-generator control system MS2 according to a third embodiment of the present invention will be described hereinafter.

Figure 9:
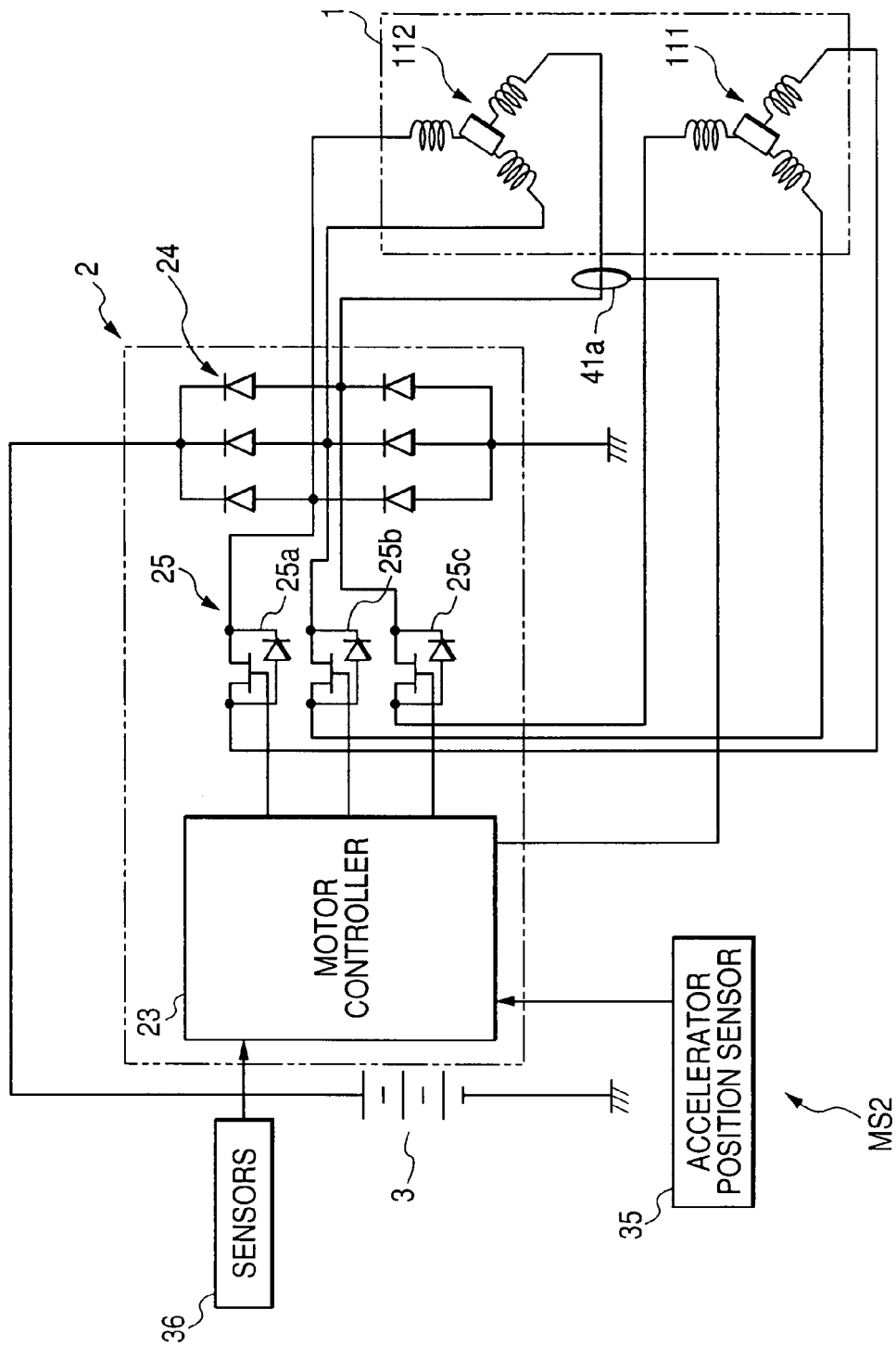
FIG. 9 is a circuit diagram of a motor-generator control system according to a third embodiment of the present invention.

FIG. 9 schematically illustrates an example of the structure of the motor-generator control system MS2 according to the third embodiment.

Like reference characters are assigned to like parts in the motor-generator control systems according to the second and third embodiments, and therefore, descriptions of the like parts are omitted.

A main different point of the structure of the motor-generator control system MS2 from the motor-generator control system MS1 is that the first inverter 21 is replaced to a chopper circuit 25.

The chopper circuit 25 consists essentially of first to third transfer switches 25a to 25c. Each of the first to third switches 25a to 25c is composed of an N-channel MOS transistor. The source of each of the N-channel MOS transistors 25a to 25c is connected to the output lead extending from one of the other ends of the U-, V-, and W-phase windings of the first set 111.

The drains of the N-channel MOS transistors 25a to 25c are connected to alternating current input terminals of the three-phase full-wave rectifier 24.

In the third embodiment, the chopper circuit 25 is operative to control three-phase alternating currents to be supplied to the three-phase windings of the first set 111.

Similar to the first embodiment, the three-phase alternating currents flowing through the three-phase windings of the first set 111 excite the rotor 15. The rotating rotor generates a rotating magnetic filed that cuts the magnetic fluxes of the second set 112 of three-phase windings, thereby inducing three-phase alternating currents flowing through the three-phase windings of the second set 112.

Therefore, the motor controller 23 controls the chopper circuit 25 based on one phase current of the second set 112 of three-phase windings measured by a current sensor 41a to thereby adjust the three-phase alternating currents to be supplied to the three-phase windings of the first set 111. This allows the three-phase alternating currents generated by the three-phase windings of the second set 112 to be adjusted. Note that, in the third embodiment, one phase current of the second set 112 of three-phase windings is measured by the current sensor 41a, but various types of current devices can be used to measure at least one phase of at least one of the first and second sets of three-phase windings.

Fourth Embodiment

A motor-generator control system MS3 according to a fourth embodiment of the present invention will be described hereinafter.

Figure 10:
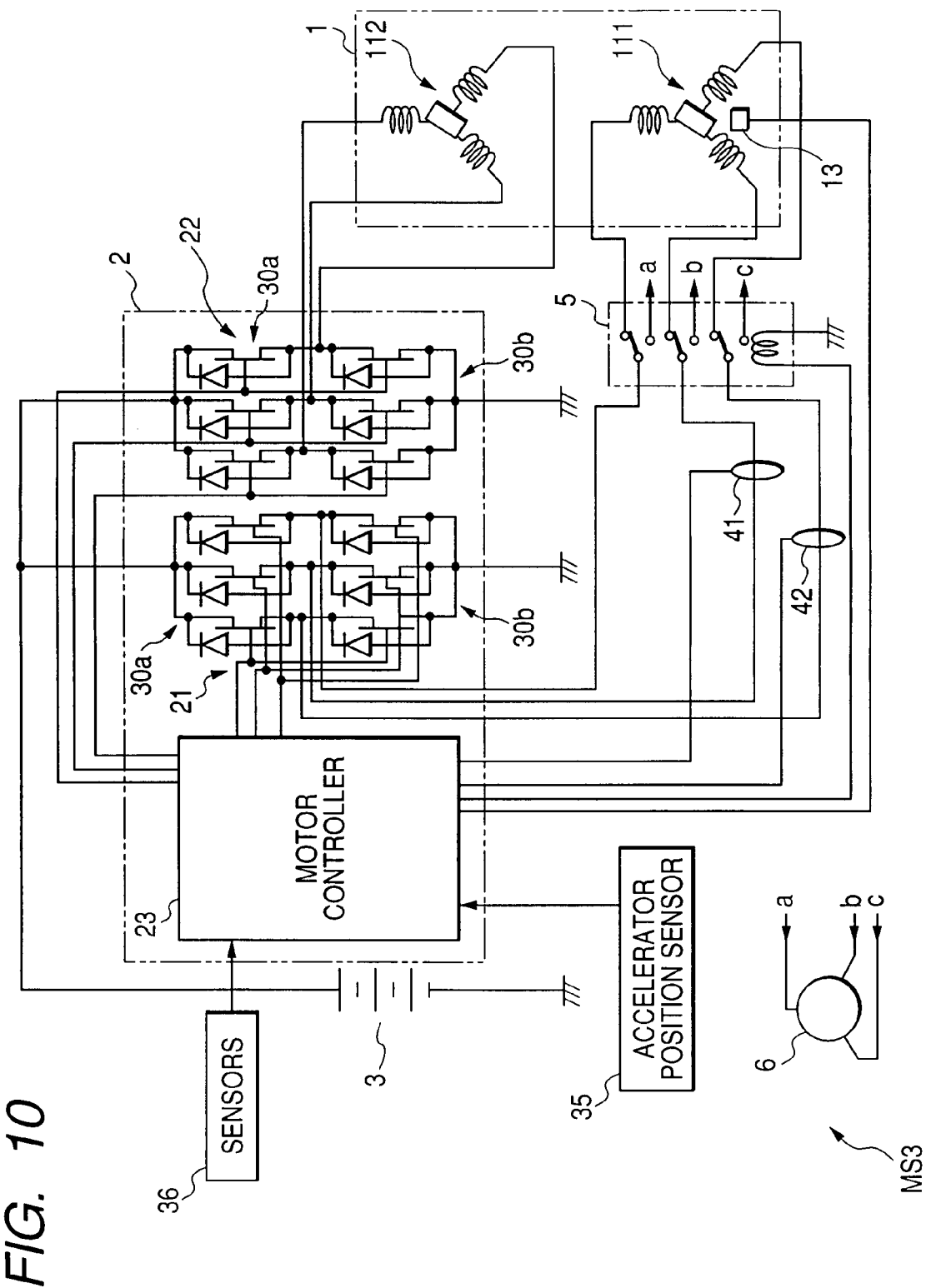
FIG. 10 is a circuit diagram of a motor-generator control system according to a fourth embodiment of the present invention.

FIG. 10 schematically illustrates an example of the structure of the motor-generator control system MS3 according to the fourth embodiment.

Like reference characters are assigned to like parts in the motor-generator control systems according to the first and fourth embodiments, and therefore, descriptions of the like parts are omitted.

A main different point of the structure of the motor-generator control system MS3 from the motor-generator control system MS is to provide a switch circuit 5 between the first inverter 21 and the first set 111 of three-phase windings. The switch circuit 5 is configured to select one of the first set 111 of three-phase windings and an external three-phase electrical load 6 and to supply the three-phase alternating currents output from the first inverter 21 to the selected one of the first set 111 of three-phase windings and the external three-phase electrical load 6.

The switch circuit 5 is designed as a relay having three selector switches. Each of the selector switches is composed of a common terminal connected to one of the connecting points between the high- and low-side switching elements 30a and 30b of the respective half-bridges of the first inverter 21.

Each of the selector switches is also composed of a pair of selector terminals. One of the paired selector terminals of each of the selector switches is connected to one of the output leads extending from the other ends of the three-phase windings of the first set 111. The other end of the paired selector terminals of each of the selector switches is connected to one of alternating current terminals of the external three-phase electrical load 6. As the external three-phase electrical load 6, rotating electrical machines, alternators, and the like can be used.

In the fourth embodiment of the present invention, when the first set 111 of three-phase windings of the motor-generator 1 is not energized, the first inverter 21 is operative to supply the three-phase alternating currents to the external three-phase electrical load 6. This allows the first inverter 21 to be sharable between the first set 111 of three-phase windings and the external three-phase electrical load 6, making it possible to reduce the number of three-phase inverters.

Fifth Embodiment

A motor-generator control system MS4 according to a fifth embodiment of the present invention will be described hereinafter.

Figure 11:
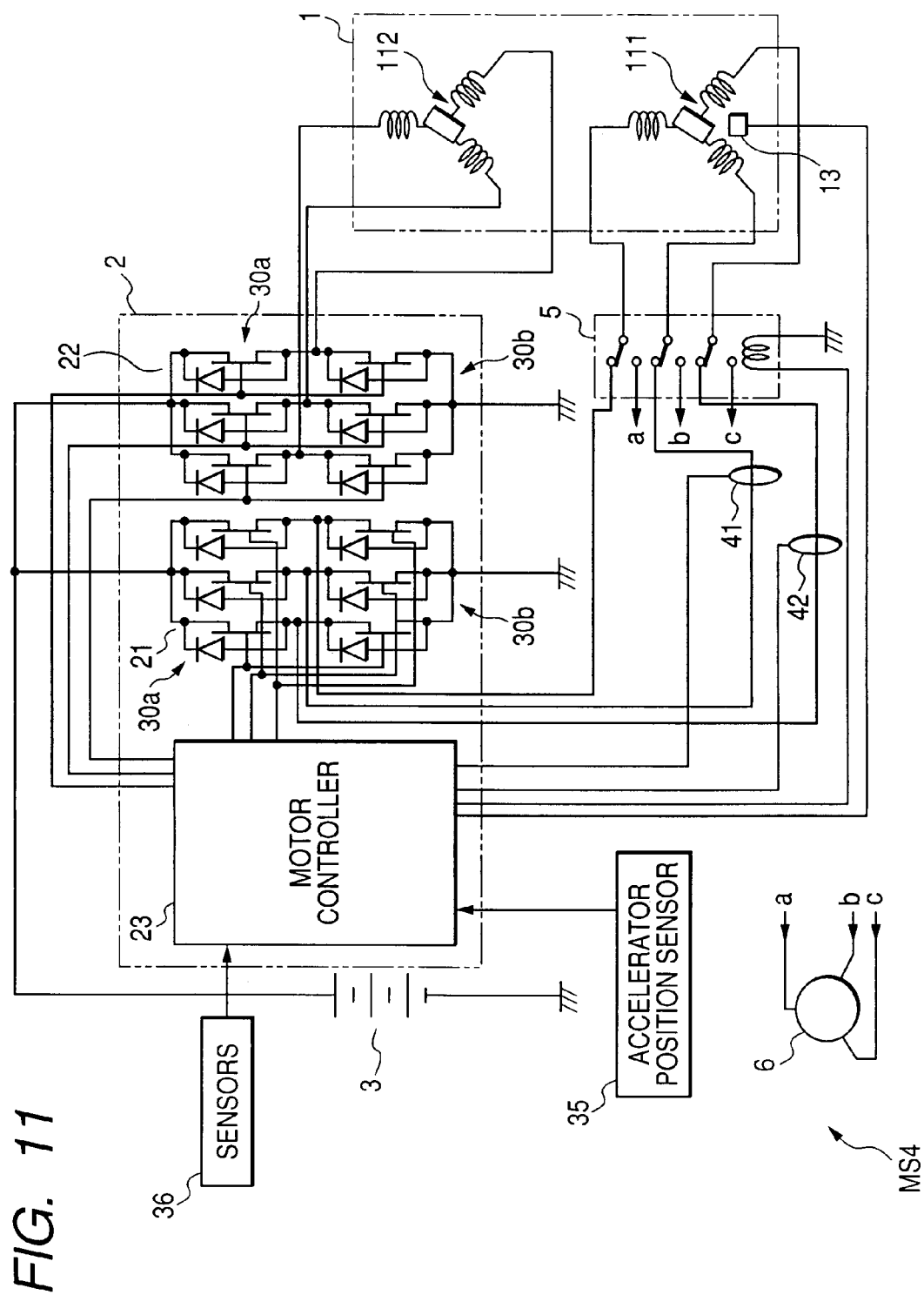
FIG. 11 is a circuit diagram of a motor-generator control system according to a fifth embodiment of the present invention.

FIG. 11 schematically illustrates an example of the structure of the motor-generator control system MS4 according to the fifth embodiment.

Like reference characters are assigned to like parts in the motor-generator control systems according to the fourth and fifth embodiments, and therefore, descriptions of the like parts are omitted.

A main different point of the structure of the motor-generator control system MS4 from the motor-generator control system MS3 is that the switch circuit 5 is configured to select one of the first inverter 21 and the external three-phase electrical load 6 and to supply the three-phase alternating voltages generated by the first set 111 of three-phase windings to the selected one of the first inverter 21 and the external three-phase electrical load 6.

Specifically, the common terminal of each of the selector switches 5 is connected to one of the output leads extending from the other ends of the three-phase windings of the first set 111.

Each of the selector switches 5 is also composed of a pair of selector terminals. One of the paired selector terminals of each of the selector switches is connected to one of the alternating current terminals of the first inverter 21. The other end of the paired selector terminals of each of the selector switches 5 is connected to one of alternating current terminals of the external three-phase electrical load 6. As the external three-phase electrical load 6, rotating electrical machines, alternators, and the like can be used.

In the fifth embodiment of the present invention, it is possible to specially supply the three-phase alternating power generated by the first set 111 of three-phase windings to the external three-phase electrical load 6.

Figure 12:
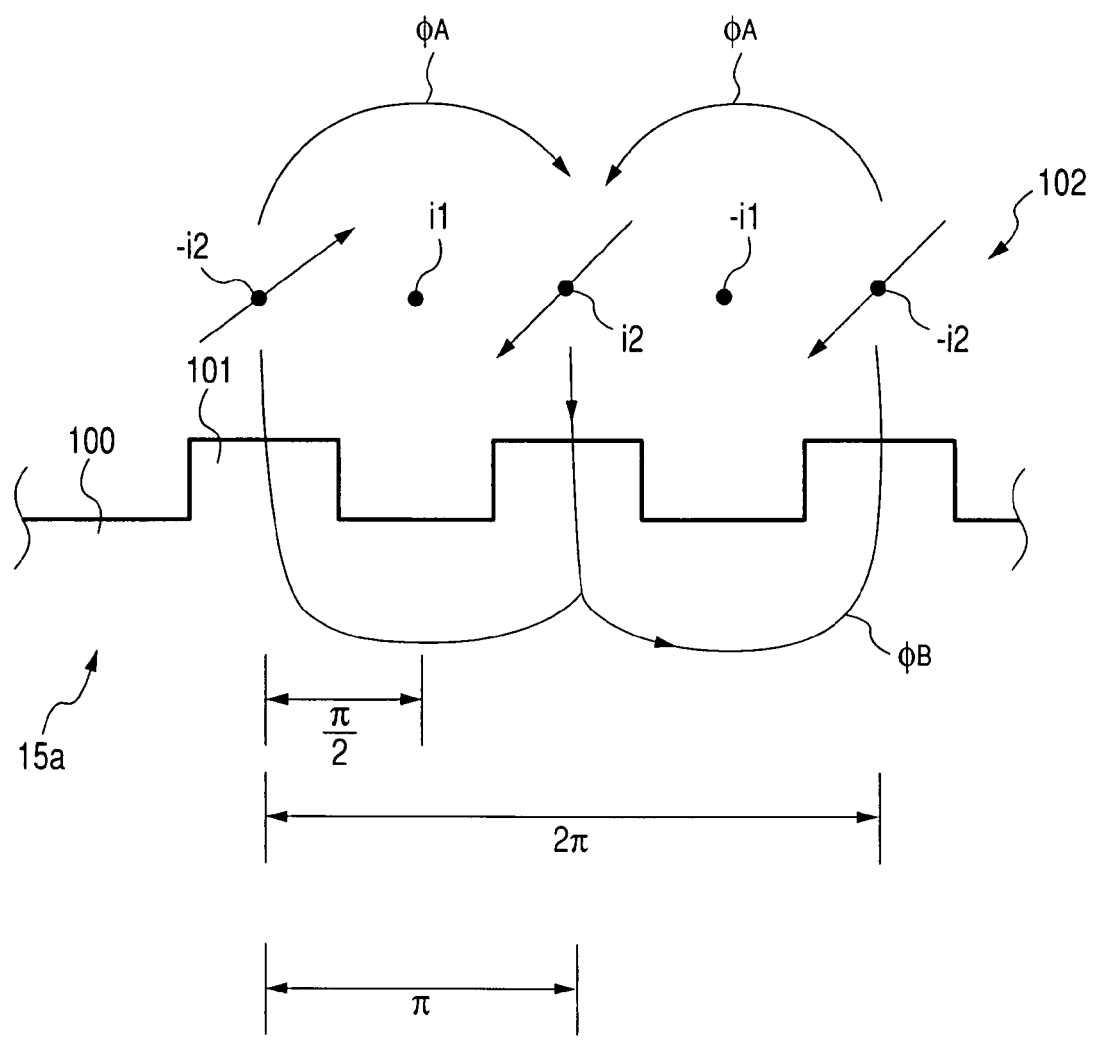
FIG. 12 is an enlarged development view of part of a silent pole core of a rotor of a motor-generator according to a modification of each of the first to fifth embodiments of the present invention.

As the motor-generator 1, when a reluctance motor having a rotor 15a with a salient pole core 100 is used, as illustrated in FIG. 12, first three-phase alternating currents i1 can be supplied to the first set 111 of three-phase windings such that the rotational position δ of the rotor 15 is set to generate the maximum amount of magnetic flux φA on a salient portion 101 of the rotor core 100.

In addition, second three-phase alternating currents i2 for energizing the second set 112 of three-phase windings or causing it to generate three-phase alternating voltages can be supplied to the second set 112 of three-phase windings such that:

the rotational position δ of the rotor 15 is set to cause a magnetic flux φB created based on the three-phase alternating voltages supplied to the second set 112 to cut the magnetic flux A, thereby generating the maximum amount of torque (positive or negative).

In this modification, the phase difference Δθ between the stator current vector based on the first three-phase alternating currents i1 and that based on the second three-phase alternating currents i2 is set to π/2 radian.

Control of the magnitude of the second three-phase alternating currents i2 therefore allows effective generation control and/or effective motor torque control to be performed.

Note that, as illustrated in FIG. 12, the first three-phase currents i1 can be arranged in the Q-axis, and the second three-phase currents i2 can be arranged in the D-axis.

As described above, the motor controller 23 is operative to use a request torque and the engine speed (a number of revolutions of the motor-generator 1) to control the phase difference Δθ between the stator current vector ia1* based on the D-axis component id1* and Q-axis component iq1* for the first set 111 of three-phase windings and the stator current vector ia2* based on the D-axis component id2* and Q-axis component iq2* for the second set 112 of three-phase windings.

Therefore, as illustrated in FIG. 1, the motor controller 23 has stored therein map data 23a, such as a map program and/or a map table, that represents relationships among the variable request torque, the variable number of revolutions of the motor-generator 1, and the variable phase difference Δθ and among the variable request torque, the variable number of revolutions, and the variable rotational position δ of the rotor 15.

The map data 23a allows the controller 23 to determine a value of the variable rotational position δ and that of the variable phase difference Δθ based on an input request torque and an input measured number of revolutions of the motor-generator 1. Accordingly, the motor controller 23 can control the first and second inverters 21 and 22 based on the determined values of the rotational position δ and the phase difference Δθ.

Figure 2C:
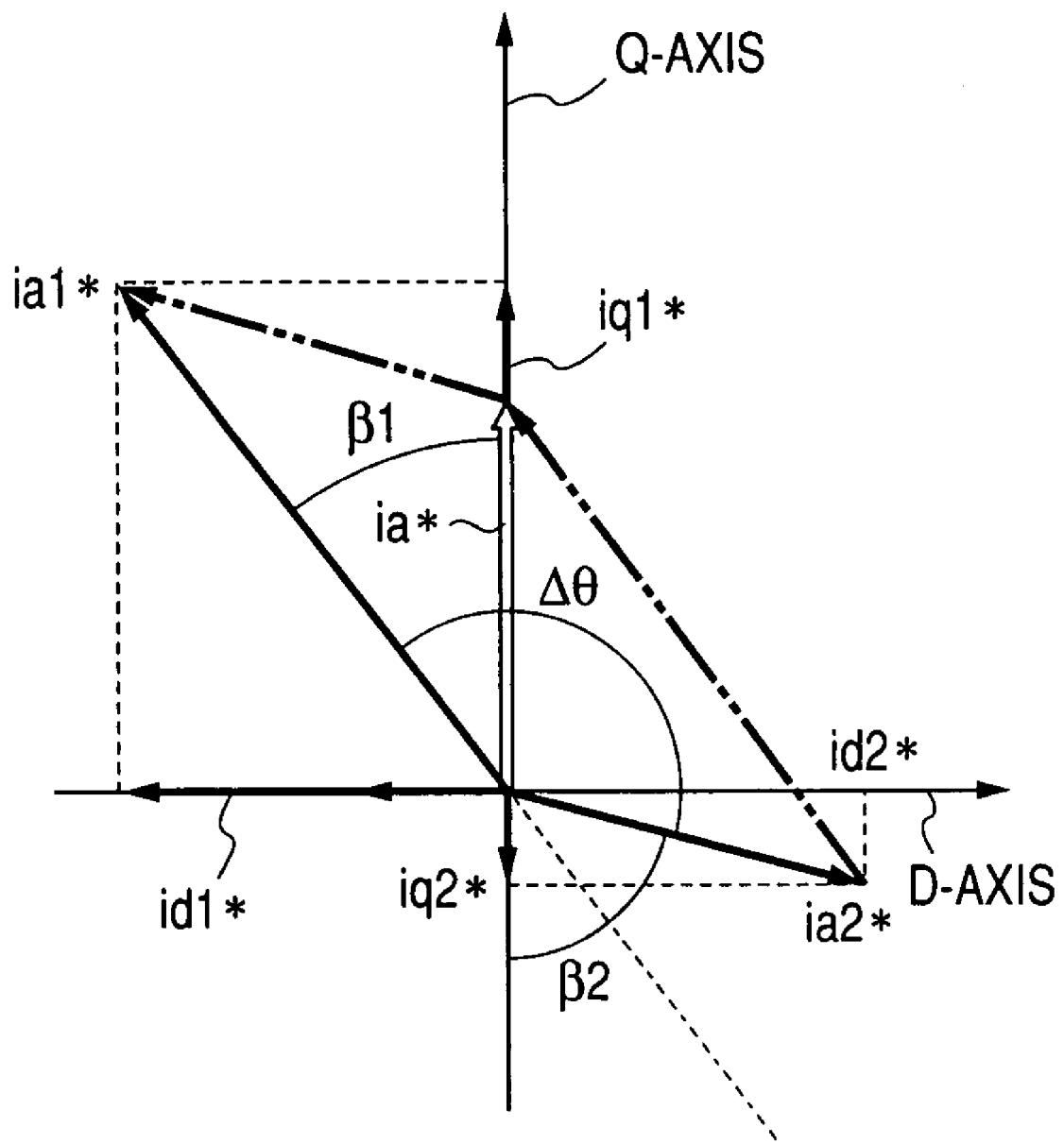
FIG. 2C is a vector diagram schematically illustrating another phase difference between a stator current vector of the first set of three-phase windings and a stator current vector of the second set of three-phase windings.

As illustrated in FIG. 2C, the motor controller 23 and the first inverter 21 can energize the first set 111 of three-phase windings to create a positive torque (motor torque) that permits the motor-generator 1 to serve as the motor. In addition, the motor controller 23 and the second inverter 22 can energize the second set 112 of three-phase windings to create a negative torque (generation torque) that permits the motor-generator 1 serve as the generator.

The first and second inverters 21 and 22 can work in selectively one of normal 120 degree mode and normal 180 degree mode.

For example, under control of the PWM driver 23e, the first inverter 21 works in 120 degree mode to apply a voltage to each of the three-phase windings of the first set 111 every the rotor rotates by 120 degrees. In addition, the second inverter 22 works in 180 degree mode to apply a voltage to each of the three-phase windings of the second set 112 every the rotor rotates by 180 degrees.

Preferably, each of the first and second inverters 21 and 22 can apply a voltage to at least one of the three-phase windings for creating torque every the rotor rotates by 120 degrees. In addition, each of the first and second inverters 21 and 22 can apply a voltage to another three-phase winding for creating a magnetic field that intersects the at least one of the three-phase windings for creating torque every the rotor rotates by 180 degrees. This can eliminate the amount of energization for the three-phase windings of each of the first and second sets 111 and 112.

Under control of the PWM driver 23e, the first inverter 21 can work in rectangular wave mode to apply a rectangular voltage to each of the three-phase windings of the first set 111 every the rotor rotates by 120 degrees. In addition, under control of the PWM driver 23e, the second inverter 22 can work in sinusoidal wave mode to apply a sinusoidal wave voltage to each of the three-phase windings of the second set 112 every the rotor rotates by 180 degrees.

Preferably, each of the first and second inverters 21 and 22 can apply a rectangular wave voltage to at least one of the three-phase windings for creating torque every the rotor rotates by 120 degrees. In addition, each of the first and second inverters 21 and 22 can apply a sinusoidal wave voltage to another three-phase winding for creating a magnetic field that intersects the at least one of the three-phase windings for creating torque every the rotor rotates by 180 degrees. This can eliminate the amount of energization for the three-phase windings of each of the first and second sets 111 and 112.

When the motor-generator 1 is expected to work under heavy load conditions, it is possible for the motor controller 23 to drive the first and second inverters 21 and 22 at a predetermined voltage wave that is shifted in phase from the rotor 15. In addition, under part-load operation, the motor controller 23 can only drive the second inverter 22 without driving the first inverter 21 to put the first inverter 21 to a sleep mode.

In each of the first to third embodiments, the battery 3 is operative to feed a power supply voltage to each of the first and second inverters 21 and 22, but different batteries can feed power supply voltages to corresponding first and second inverters 21 and 22.

In each of the first to fifth embodiments and their modifications, the present invention is applied to a motor-generator. In the specification, the motor-generator means a rotary electric machine can serve as either a motor operative to generate a positive torque (motor torque) or a generator operative to generate a negative torque (generator torque).

In each of the first to fifth embodiments, the present invention is applied to control systems for control of a motor-generator having a first set of three-phase windings and a second set of three-phase windings. The present invention is however limited to the applications. Specifically, the present invention can be applied to control systems having first and second multiphase inverters for control of a motor-generator having a first set of multiphase windings and a second set of multiphase windings. It is preferable that the present invention is applied to control systems for control of a motor-generator having a first set of symmetrically arranged multiphase windings and a second set of symmetrically arranged multiphase windings.

In each of the first to fifth embodiments and their modifications, the motor-generator control system has been installed in a vehicle, but it can be installed in a system in which a motor-generator is installed beforehand.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A motor-generator control system for controlling a motor-generator, the motor-generator having a first set of multiphase windings and a second set of multiphase windings, the first and second sets of multiphase windings being arranged to be spatially shifted in phase from each other, the motor-generator control system comprising:

an allocating unit configured to, upon input of workload request for the motor-generator, determine:

a first torque to be allocated to the first set of multiphase windings, a second torque to be allocated to the second set of multiphase windings, a resultant torque of the first torque and second torque meeting the input workload request for the motor-generator, and a phase difference based on the first torque and second torque to be respectively allocated to the first and second sets of multiphase windings, the phase difference representing a phase difference between a first alternating current for each phase winding of the first set and a second alternating current for a corresponding one phase winding of the second set, the input workload request and the phase difference determining the first alternating current for each phase winding of the first set and the second alternating current for each phase winding of the second set; and an energizing unit configured to energize, based on the phase difference, the first set of multiphase windings and the second set of multiphase windings to create the first torque and the second torque, respectively.

2. A motor-generator control system according to claim 1, wherein the energizing unit comprises:

a first energizing unit configured to feed the determined first alternating current to each phase winding of the first set to thereby create the first torque; and a second energizing unit configured to feed the determined second alternating current to each phase winding of the second set to thereby create the second torque.

3. A motor-generator control system according to claim 2, wherein the input workload request for the motor-generator includes a request torque for the motor-generator, and the allocating unit includes a sensor arranged to measure the number of revolutions of the motor-generator, the allocating unit working to determine the phase difference based on the request torque for the motor-generator and the measured number of revolutions of the motor-generator.

4. A motor-generator control system according to claim 1, wherein the allocating unit is configured to adjust at least one of magnitude and orientation of the first torque and at least one of magnitude and orientation of the second torque to be respectively allocated to the first and second sets of multiphase windings, and the energizing unit includes a first inverter, a second inverter, and a driving unit, the driving unit causing the first inverter to work in a first mode so as to energize the first set of multiphase windings, the driving unit causing the second inverter to work in a second mode so as to energize the second set of multiphase windings.

5. A motor-generator control system according to claim 4, wherein the driving unit drives the first inverter in a motor mode as the first mode to energize the first set of multiphase windings, thereby creating a positive torque as the first torque, and drives the second inverter in a generator mode as the second mode to energize the second set of multiphase windings, thereby creating a negative torque as the second torque, the positive torque permitting the motor-generator to serve as a motor, the negative torque permitting the motor-generator to serve as a generator.

6. A motor-generator control system according to claim 4, wherein the driving unit works to drive the first inverter in 120 degree mode to apply a voltage to the first set of multiphase windings every the motor-generator rotates by 120 degrees, and to drive the second inverter in 180 degree mode to apply a voltage to the second set of multiphase windings every the motor-generator rotates by 180 degrees.

7. A motor-generator control system according to claim 4, wherein the driving unit works to drive the first inverter to apply a rectangular voltage to the first set of multiphase windings, and to drive the second inverter to apply a sinusoidal voltage to the second set of multiphase windings.

8. A motor-generator control system according to claim 4, wherein the first inverter is composed of a multiphase full-wave rectifier configured to full-wave rectify the first alternating current, the first alternating current being generated by the energized first set of multiphase windings based on a negative torque as the first torque, and the second inverter is configured to carry out at least one of:

transfer of the second multiphase alternating current to the second set of multiphase windings, thereby generating the second torque; and receipt of third multiphase alternating current from the second set of multiphase windings, the third multiphase alternating current being created by the energized second set of multiphase windings based on a negative torque as the second torque.

9. A motor-generator control system according to claim 8, wherein the second inverter is configured to apply the third multiphase alternating current to the first set of multiphase windings, the third multiphase alternating current causing the first set of multiphase windings to create the negative torque.

10. A motor-generator control system according to claim 9, wherein the driving unit works to control at least one of a magnitude and a phase of the first multiphase alternating current so as to adjust an output of the multiphase full-wave rectifier.

11. A motor-generator control system according to claim 10, wherein the motor-generator includes a rotor rotatably supported thereto, the rotor including a salient pole core without containing field coils and field magnets.

12. A motor-generator control system according to claim 8, wherein the multiphase full-wave rectifier has a plurality of multiphase alternating current input terminals, and the second inverter includes a chopper circuit, the chopper circuit including a plurality of transfer switches respectively connecting between the multiphase alternating current input terminals of the multiphase full-wave rectifier and the multiphase windings of the second set, respectively.

13. A motor-generator control system according to claim 1, wherein the energizing unit includes a first inverter, a second inverter, and a driving unit, the driving unit causes the first inverter to feed the first multiphase alternating current to each phase winding of the first set, the first alternating current allowing the first set of multiphase windings to create a rotating magnetic field, the driving unit causing the second inverter to rectify the second multiphase alternating current generated by the energized second set of multiphase windings based on a negative torque as the second torque, the rotating magnetic field intersecting the second set of multiphase windings.

14. A motor-generator control system according to claim 1, wherein the energizing unit includes a first inverter, a second inverter, and a driving unit, the first inverter being configured to carry out at least one of:

transfer of the first multiphase alternating current to the first set of multiphase windings, thereby generating the first torque; and receipt of the first multiphase alternating current from the first set of multiphase windings, the first multiphase alternating current being generated by the energized first set of multiphase windings based on a negative torque as the first torque, the second inverter being configured to carry out at least one of:

transfer of the second multiphase alternating current to the second set of multiphase windings, thereby generating the second torque; and receipt of the second multiphase alternating current from the second set of multiphase windings, the second multiphase alternating current being-generated by the energized second set of multiphase windings based on a negative torque as the second torque, the energizing unit further comprising a selector switch, the selector switch working to selectively connect one of the first set of multiphase windings and an external multiphase electrical load to the first inverter.

15. A motor-generator control system according to claim 1, wherein the energizing unit includes a first inverter, a second inverter, and a driving unit, the first inverter being configured to carry out at least one of:

transfer of the first multiphase alternating current to the first set of multiphase windings, thereby generating the first torque; and receipt of the first multiphase alternating current from the first set of multiphase windings, the first multiphase alternating current being generated by the energized first set of multiphase windings based on a negative torque as the first torque, the second inverter being configured to carry out at least one of:

transfer of the second multiphase alternating current to the second set of multiphase windings, thereby generating the second torque; and receipt of the second multiphase alternating current from the second set of multiphase windings, the second multiphase alternating current being generated by the energized second set of multiphase windings based on a negative torque as the second torque, the energizing unit further comprising a selector switch, the selector switch working to selectively connect one of the first inverter and an external three-phase electrical load to the first set of multiphase windings.

16. A motor-generator control system according to claim 1, wherein the multiphase windings of the first set are three-phase windings each having one end, the one ends of the three-phase windings of the first set are connected to each other in star configuration to constitute a first neutral point, the multiphase windings of the second set are three-phase windings each having one end, and the one ends of the three-phase windings of the second set are connected to each other in star configuration to constitute a second neutral point independent of the first neutral point.

* * * * *